US012590843B2

(12) United States Patent
   Kim et al.

(10) Patent No.: US 12,590,843 B2
(45) Date of Patent: Mar. 31, 2026

(54) THERMAL IMAGING PIXEL, THERMAL IMAGING SENSOR, AND BOLOMETER

(71) Applicant: SAMSUNG ELECTRONICS CO., LTD., Suwon-si (KR)

(72) Inventors: Jinmyoung Kim, Suwon-si (KR); Byonggwon Song, Suwon-si (KR); Jangwoo You, Suwon-si (KR); Duhyun Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 367 days.

(21) Appl. No.: 18/227,488

(22) Filed: Jul. 28, 2023

(65) Prior Publication Data

US 2024/0219240 A1     Jul. 4, 2024

(30) Foreign Application Priority Data

Jan. 4, 2023     (KR) ........................ 10-2023-0001325

(51) Int. Cl.
   *G01J 5/20*      (2006.01)
   *H04N 25/21*     (2023.01)
   *G01J 5/00*      (2022.01)

(52) U.S. Cl.
   CPC ......... *G01J 5/20* (2013.01); *G01J 2005/0077* (2013.01); *G01J 2005/202* (2013.01); *H04N 25/21* (2023.01)

(58) Field of Classification Search
   CPC ................. G01J 5/20; G01J 2005/0077; G01J 2005/202; H04N 25/21
   See application file for complete search history.

(56) References Cited

U.S. PATENT DOCUMENTS

| | | | |
|---|---|---|---|
| 6,392,232 B1 * | 5/2002 | Gooch ...................... | G01J 5/20 |
| | | | 257/E27.008 |
| 10,348,982 B1 * | 7/2019 | Lacroix ............... | H04N 25/671 |
| 10,732,661 B1 | 8/2020 | Arndt et al. | |
| 2005/0067556 A1 | 3/2005 | Kaushal et al. | |
| 2012/0193736 A1 | 8/2012 | Mather et al. | |
| 2018/0197591 A1 | 7/2018 | Stainer | |

(Continued)

FOREIGN PATENT DOCUMENTS

| | | |
|---|---|---|
| KR | 10-2014-0136340 A | 11/2014 |
| WO | 2021021690 A1 | 2/2021 |

OTHER PUBLICATIONS

Kanai et al., "Theory of relaxation time of stochastic nano magnets", Physical Review B 103, 094423 (2021), Mar. 2021, 12 total pages, doi:10.1103/PhysRevB.103.094423.

(Continued)

*Primary Examiner* — Randy W Gibson
(74) *Attorney, Agent, or Firm* — Sughrue Mion, PLLC

(57)                    ABSTRACT

A thermal imaging pixel, including a variable resistor array; and a pixel readout circuit configured to read electrical signals corresponding to a composite resistance of the variable resistor array, wherein the variable resistor array includes a plurality of variable resistor subarrays electrically connected in series, wherein each variable resistor subarray of the plurality of variable resistor subarrays includes a plurality of variable resistor cells electrically connected in parallel, and wherein each variable resistor cell of the plurality of variable resistor cells has a resistance which changes according to temperature.

20 Claims, 17 Drawing Sheets

(56) References Cited

U.S. PATENT DOCUMENTS

| | | | |
|---|---|---|---|
| 2020/0072664 A1* | 3/2020 | Ohta | ................. G11C 13/0038 |
| 2020/0135806 A1 | 4/2020 | Peng et al. | |
| 2021/0247239 A1 | 8/2021 | Qoutb et al. | |
| 2022/0260425 A1 | 8/2022 | Jacob et al. | |

OTHER PUBLICATIONS

Sengupta et al., "Magnetic Tunnel Junction as an On-Chip Temperature Sensor", Scientific Reports, Sep. 2017, 8 total pages, doi:10.1038/s41598-017-11476-7.

Wu et al., "Tunnel Magnetoresistance Based Passive Resistance Replacement in Hybrid MTJ-CMOS Integration", IEEE Transactions on Nanotechnology, 2022, pp. 638-647, vol. 21, doi:10.1109/TNANO.2022.3216778.

Communication dated Mar. 18, 2024, issued by European Patent Office in European Patent Application No. 23204105.3.

\* cited by examiner

THERMAL IMAGING PIXEL, THERMAL IMAGING SENSOR, AND BOLOMETER

CROSS-REFERENCE TO RELATED APPLICATION

This application is based on and claims priority under 35 U.S.C. § 119 to Korean Patent Application No. 10-2023-0001325, filed on Jan. 4, 2023, in the Korean Intellectual Property Office, the disclosure of which is incorporated by reference herein in its entirety.

BACKGROUND

1. Field

The disclosure relates to a thermal imaging pixel, a thermal imaging sensor, and a bolometer.

2. Description of the Related Art

Two types of long wave infrared (LWIR) sensors for detecting LWIR may include a quantum type LWIR sensor and a thermal type LWIR sensor. Quantum-type sensors have excellent quantum conversion efficiency and low thermal noise based on the photoelectric effect, and also have detectivity and noise equivalent temperature difference (NETD) characteristics. However, quantum sensors may have a disadvantage in that a region that responds to infrared rays is determined according to a bandgap and must be maintained at a very low operating temperature. Thermal-type sensors may include a bolometer sensor which may use the principle that the resistance of a material changes with temperature, pyroelectric sensors and ferroelectric sensors which may use changes in polarization of a material according to temperature, and thermopile sensors which may use changes in an electromotive force according to temperature. Thermal-type sensors may further include a bimetal sensor which uses a change in warpage according to heat based on a difference in thermal expansion coefficients according to temperature. Thermal-type sensors may be relatively inexpensive because they may operate at room temperature. However, the basic thermal noise of the thermal-type sensors may be high due to the room temperature, and thus, the NETD of the thermal-type sensors may be less than that of the quantum-type sensors.

SUMMARY

Provided are a thermal imaging pixel, a thermal imaging sensor, and a bolometer.

Additional aspects will be set forth in part in the description which follows and, in part, will be apparent from the description, or may be learned by practice of the presented embodiments of the disclosure.

In accordance with an aspect of the disclosure, a thermal imaging pixel includes a variable resistor array; and a pixel readout circuit configured to read electrical signals corresponding to a composite resistance of the variable resistor array, wherein the variable resistor array includes a plurality of variable resistor subarrays electrically connected in series, wherein each variable resistor subarray of the plurality of variable resistor subarrays includes a plurality of variable resistor cells electrically connected in parallel, and wherein each variable resistor cell of the plurality of variable resistor cells has a resistance which changes according to temperature.

In accordance with an aspect of the disclosure, a thermal imaging sensor includes a thermal imaging pixel including a variable resistor array; and a readout circuit configured to read electrical signals corresponding to an average of a composite resistance of the variable resistor array over time; wherein the variable resistor array includes a plurality of variable resistor subarrays electrically connected in series, wherein each of the plurality of variable resistor subarrays includes a plurality of variable resistor cells electrically connected in parallel, and wherein each variable resistor cell of the plurality of variable resistor cells has a resistance which changes according to temperature.

In accordance with an aspect of the disclosure, a bolometer includes a variable resistor array including a plurality of variable resistor subarrays electrically connected in series, wherein each variable resistor subarray of the plurality of variable resistor subarrays includes a plurality of variable resistor cells electrically connected in parallel, and wherein each variable resistor cell of the plurality of variable resistor cells has a resistance which changes according to temperature.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1:
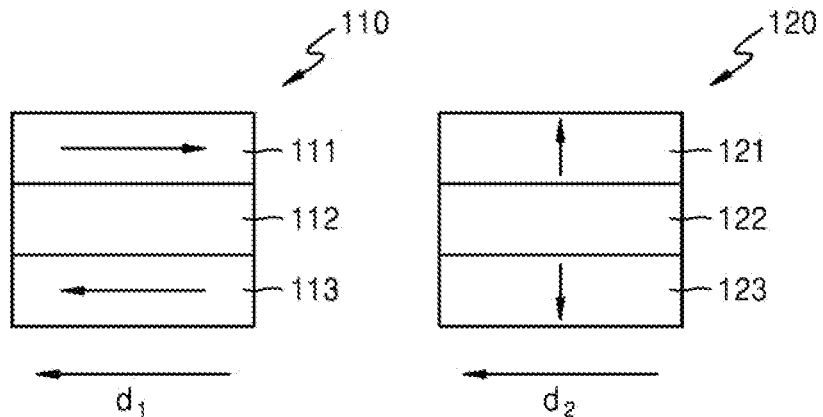
FIG. 1 shows an in-plane magnetic tunnel junction (MTJ) and a perpendicular MTJ.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

FIG. 1 shows an in-plane magnetic tunnel junction (MTJ) 110 and a perpendicular MTJ 120. An MTJ may include two magnetic layers separated by an insulating layer. The magnetic orientation in the two magnetic layers can be either parallel or antiparallel, and a type of the MTJ may be determined based on the magnetic orientation in the two magnetic layers.

Types of MTJs may include an in-plane MTJ 110 and a perpendicular MTJ 120. In the in-plane MTJ 110, the direction of the magnetic polarity of a pinned layer 113 is parallel to, or is the same as, a direction in which the pinned layer 113 extends, for example a direction $d_1$, which may be a longitudinal direction of the pinned layer 113. In the perpendicular MTJ 120, a direction of the magnetic polarity of a pinned layer 123 intersects, or is perpendicular to, a direction (in which the pinned layer 123 extends, for example a direction $d_2$, which may be a longitudinal direction of the pinned layer 123.

The in-plane MTJ 110 may include a pinned layer 113, an insulation layer 112, and a free layer 111. The pinned layer 113 and the free layer 111 may include a ferromagnetic material. For example, the pinned layer 113 and the free layer 111 may include CoFeB, CoFe, Co, TbFeCo, GdFeCo, FeCo, NiFe, Fe, or a combination thereof, but embodiments are not limited thereto. The insulation layer 112 may include $MgO$, $Al_2O_3$, or a combination thereof, but embodiments are not limited thereto. Each of a pinned layer 123, an insulation layer 122, and a free layer 121 of the perpendicular MTJ 120 may include the same materials as the pinned layer 113, the insulation layer 112, and the free layer 111 of the in-plane MTJ 110.

Compared to the perpendicular MTJ 120, it may take less time for the magnetization direction of the free layer 111 of the in-plane MTJ 110 to change from a direction parallel to the magnetization direction of the pinned layer 113 to a direction antiparallel to the magnetization direction of the pinned layer 113 (or from an antiparallel direction to a parallel direction). For example, it may take an amount of time in units of ns for the magnetization direction of the free layer 111 of the in-plane MTJ 110 to change from a parallel direction with respect to the magnetization direction of the pinned layer 113 to an antiparallel direction with respect to the magnetization direction of the pinned layer 113 (or from an antiparallel direction to a parallel direction). However, it may take an amount of time in units of microseconds (μs) for the magnetization direction of free layer 121 of the perpendicular MTJ 120 to change from a parallel direction with respect to the magnetization direction of the pinned layer 123 to an antiparallel direction with respect to the magnetization direction of the pinned layer 123 (or from an antiparallel direction to a parallel direction). Here, the amount of time in units of ns may refer to several ns to hundreds of ns, and the amount of time in units of us may refer to several us to hundreds of μs.

For convenience of description, unless otherwise specified, the term "MTJ" may refer to an in-plane MTJ. However, it should be understood that embodiments of the disclosure may also be applied to a perpendicular MTJ.

Figure 2:
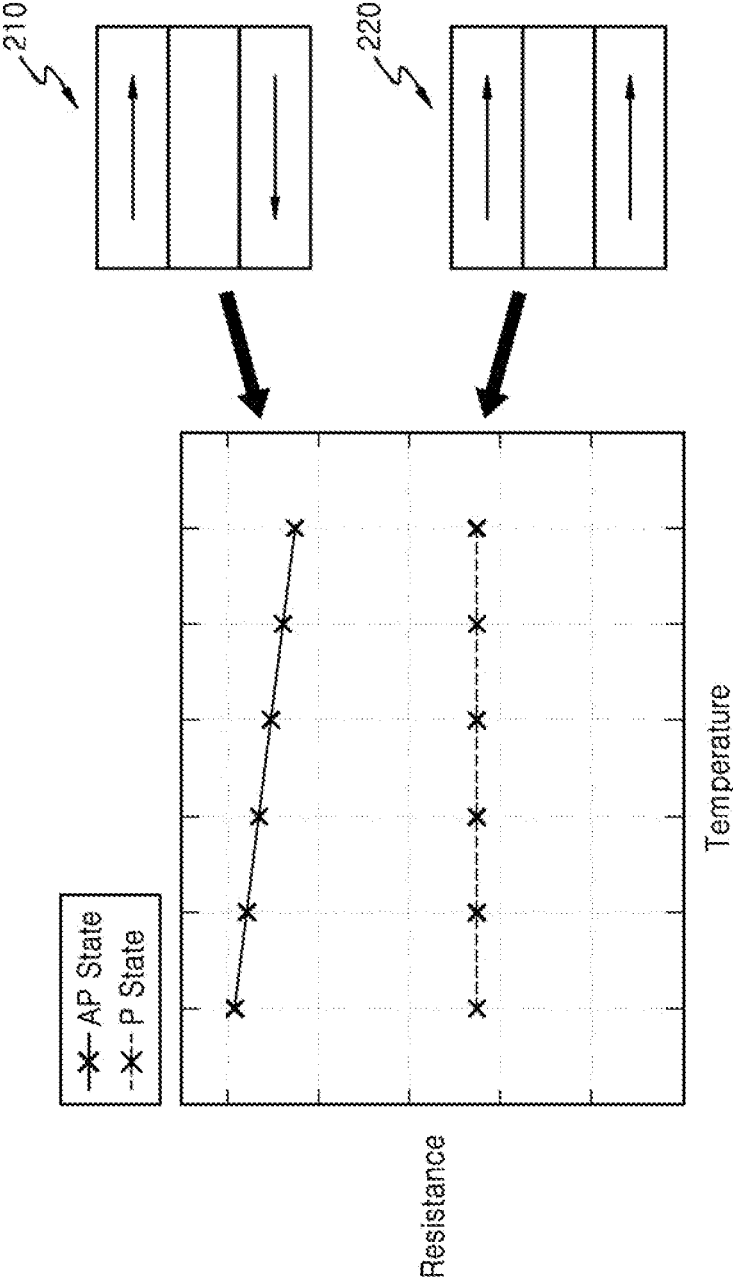
FIG. 2 is a diagram illustrating a P state and an AP state according to an embodiment.

FIG. 2 is a diagram for illustrating a P state and an AP state according to an embodiment.

The magnetization direction of the free layer of the MTJ may change. The MTJ may be in a parallel (P) state or an antiparallel (AP) state according to the magnetization direction of the free layer. FIG. 2 shows the MTJ 220 in the P state and the MTJ 210 in the AP state. The P state refers to a state in which the magnetic polarities of the pinned layer and the free layer are aligned in the same direction, and the AP state refers to a state in which the magnetic polarities of the pinned layer and the free layer are aligned in opposite directions.

FIG. 2 shows a temperature-resistance graph of the MTJ 220 in the P state and the MTJ 210 in the AP state. The MTJ 210 in the AP state has a relatively high resistance compared to the MTJ 220 in the P state. In addition, the resistance of the MTJ 210 in the AP state fluctuates according to temperature compared to the MTJ 220 in the P state.

A method of measuring temperature using a temperature coefficient of resistance (TCR) calculated simply from a temperature-resistance relationship of an MTJ in an AP state may include a reset operation to put the MTJ in an AP state. However, power is consumed by the reset operation, and a high voltage (V=IR) may be used to reset the high-resistance MTJ. Therefore, embodiments of the disclosure may relate to a thermal imaging pixel, a thermal imaging sensor, and a bolometer that do not require a reset operation.

Figure 3:
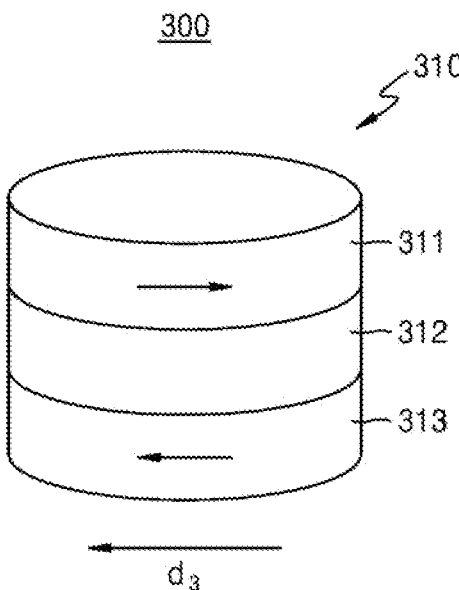
FIG. 3 shows a variable resistor cell according to an embodiment.

FIG. 3 shows a variable resistor cell 300 according to an embodiment.

The variable resistor cell 300 may include the MTJ 310. The variable resistor cell 300 may include a pinned layer 313 having a fixed magnetic polarity, an insulation layer 312 positioned adjacent to the pinned layer, and a free layer 311 positioned adjacent to the insulation layer and having a variable magnetic polarity. Each of the pinned layer 313, the insulation layer 312, and the free layer 311 may have substantially the same cross section in a direction parallel to the direction $d_3$ in which the pinned layer extends.

The variable resistor cell 300 may further include other components not shown in FIG. 3. For example, the variable resistor cell 300 may further include a seed layer, a boron absorbing layer, a capping layer, or an anti-oxidation layer, but embodiments are not limited thereto. For example, the seed layer and the capping layer may include Ta, Ru, or a combination thereof, the boron absorbing layer may include Ta, W, Hf, Nb, or a combination thereof, and the anti-oxidation layer may include Mg, W, Hf, or a combination thereof, but embodiments are not limited thereto.

The variable resistor cell 300 may be in a P state or an AP state. The magnetization direction of the free layer 311 may be parallel to the magnetization direction of the pinned layer 313 in the variable resistor cell in the P state, and the magnetization direction of the free layer 311 may be antiparallel to the magnetization direction of the pinned layer 313 in the variable resistor cell in the AP state. Due to characteristics of the MTJ, the resistance of the variable resistor cell in the P state may be smaller than the resistance of the variable resistor cell in the AP state.

Unless otherwise specified, in the disclosure, an upper surface of the variable resistor cell refers to an upper surface of the free layer with reference to FIG. 3, a lower surface of the variable resistor cell refers a lower surface of the pinned layer with reference to FIG. 3, and a direction in which the variable resistor cell extends refers to the direction $d_3$ in which the pinned layer extends.

The shape of at least one of the upper surface or the lower surface of the variable resistor cell 300 may be a circle, an ellipse, a polygon, or an arbitrary shape composed of straight lines and curves. The length of the variable resistor cell may be in units of nanometers (nm), but embodiments are not limited thereto. For example, in embodiments, the length of the variable resistor cell may be in units of micrometers (μm), but embodiments are not limited thereto. Here, the length in units of nm may refer to several nm to hundreds of nm, and the length in units of μm may refer to several μm to hundreds of μm. For example, the upper surface of the variable resistor cell may be a circle having a diameter in units of nm. For example, the upper surface of the variable resistor cell may be an ellipse in which the length of the major axis and the length of the minor axis are in units of nm.

Figure 4:
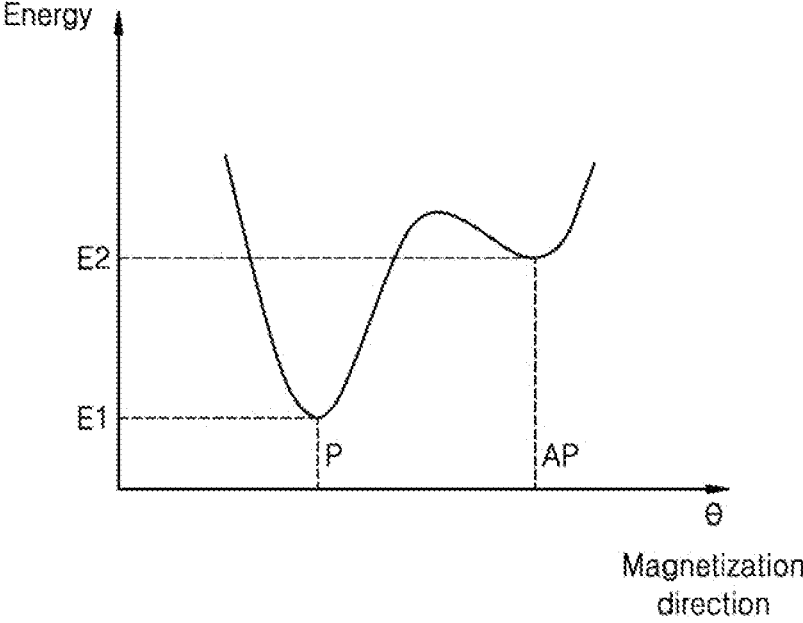
FIG. 4 shows energy according to a magnetization direction of a free layer of a variable resistor cell according to an embodiment.

FIG. 4 shows an example of energy according to a magnetization direction of a free layer of a variable resistor cell according to an embodiment.

The variable resistor cell may be configured so that the energy of the free layer in the P state is different from the energy of the free layer in the AP state. For example, in the variable resistor cell, the energy of the free layer in a state in which the magnetization direction is parallel to the pinned layer may be different from the energy of the free layer in a state in which the magnetization direction is antiparallel to the pinned layer. The variable resistor cell may be configured so that the energy E1 of the free layer in the P state is smaller than the energy E2 of the free layer in the AP state (for example, so that E1<E2), but embodiments are not limited thereto. For example, in embodiments, the variable resistor cell may be configured so that the energy E1 of the free layer in the P state is greater than the energy E2 of the free layer in the AP state (for example, so that E1>E2). In embodiments, the energy E1 may be referred to as a first energy level, and the energy E2 may be referred to as a second energy level.

For convenience of description, unless otherwise specified, the energy E1 of the free layer in the P state of the variable resistor cell is described below as being smaller than the energy E2 of the free layer in the AP state (E1<E2). However, it should be understood that the embodiments of the disclosure may be applied also to the case in which the energy of the free layer in the P state of the variable resistor cell is greater than the energy in the free layer in the AP state (E1>E2).

An asymmetric energy curve may be drawn from the different energies in the P state and the AP state. The state of the variable resistor cell at a certain temperature may be determined probabilistically from the asymmetric energy curve. Because the P state and the AP state are determined probabilistically and the resistance values in the P state and the AP state are different, the variable resistor cell may have random telegraph noise (RTN) characteristics.

When the variable resistor cell receives radiant heat, switching between the P state and the AP state may occur as the energy level of the free layer changes. The energy barrier may affect the switching probability between the P state and the AP state. As the energy barrier is lowered, the variable resistor cell may more freely move between the P state and the AP state.

Figure 5:
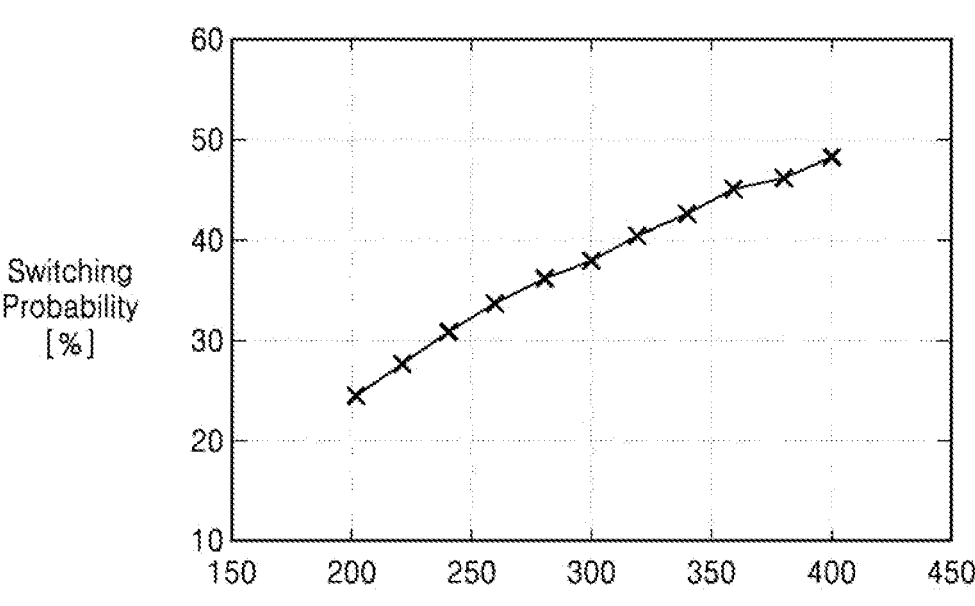
FIG. 5 shows a switching probability of a variable resistor cell as a function of temperature according to an embodiment.

FIG. 5 shows a switching probability of a variable resistor cell as a function of temperature according to an embodiment.

The graph of FIG. 5 is a temperature-switching probability graph of a variable resistor cell including a free layer having an asymmetric energy curve. More specifically, the graph of FIG. 5 shows the probability of the variable resistor cell to switch from the P state to the AP state.

Referring to FIG. 5, a switching probability from a P state to an AP state may change according to temperature. Due to the asymmetric energy curve, the variable resistor cell may not freely move between the P state and the AP state at low temperature. Accordingly, a switching probability of the variable resistor cell from the P state to the AP state at low temperature may be low. As the variable resistor cell receives radiant heat and the energy level of the free layer rises, variable resistor cell may freely move between the P state and the AP state. Accordingly, as the temperature increases, the probability of switching from the P state to the AP state may increase. For example, as the temperature increases from about 200 Kelvin to about 400 Kelvin, the switching probability of the variable resistor cell from the P state to the AP state may increase from about 24% to about 48%.

Figure 6:
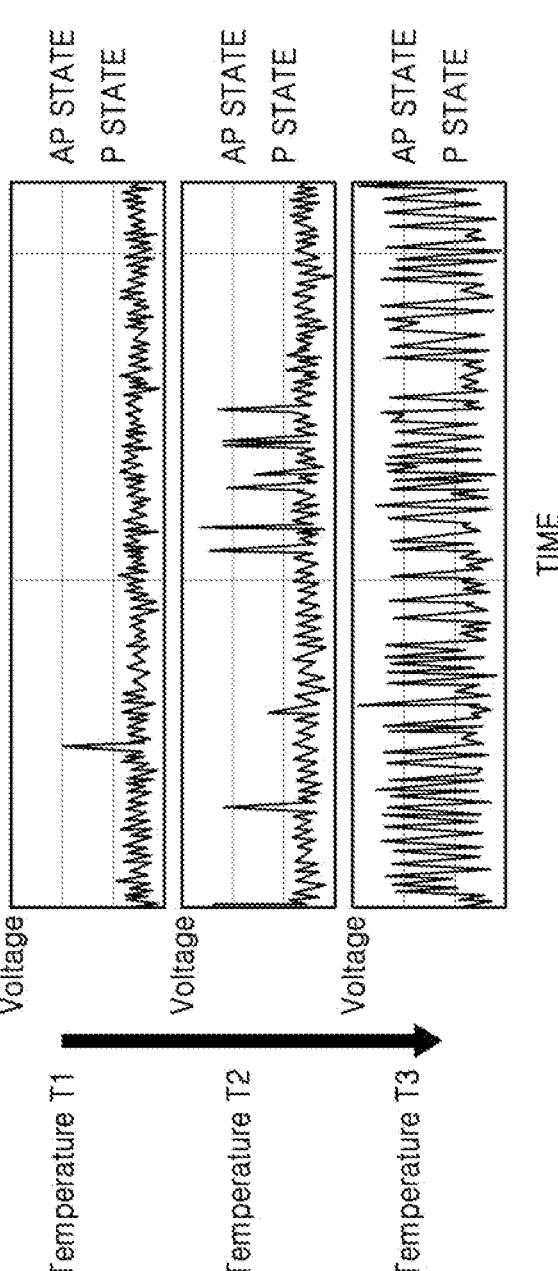
FIG. 6 is a diagram illustrating a state of a variable resistor cell as a function of temperature according to an embodiment.

FIG. 6 is a diagram for illustrating an example of a state of a variable resistor cell as a function of temperature according to an embodiment.

The graphs of FIG. 6 show examples of the state of the variable resistor cell having the switching probability of FIG. 5 for each temperature. In more detail, the graphs of FIG. 6 show the state of the variable resistor cell for each temperature over time. Referring to FIG. 6, because the switching probability of the variable resistor cell from the P state to the AP state increases as the temperature increases, the AP state appears most frequently when the temperature is highest.

The resistance of the variable resistor cell in the P state is different from that in the AP state. As the state of the variable resistor cell is probabilistically determined at a certain temperature, the resistance of the variable resistor cell at a certain temperature may be probabilistically determined. For example, the temperature may be measured by measuring the resistance (or electrical signals corresponding to the resistance) of the variable resistor cell. Because this temperature measurement method uses the RTN characteristic of the variable resistor cell, an operation to reset the variable resistor cell to a specific state may be not required. For example, a temperature measurement method using the RTN characteristic of the variable resistor cell, may be capable of measuring temperature without performing an operation to reset the variable resistor cell to a specific state.

Figure 7:
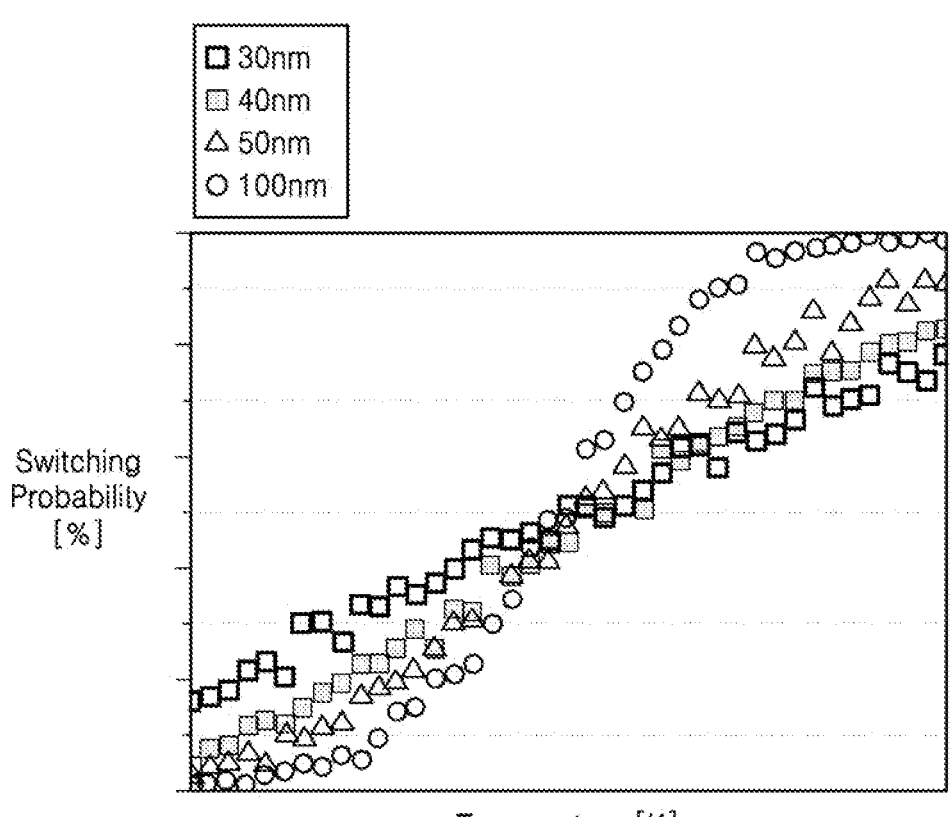
FIG. 7 shows a switching probability of different variable resistor cells according to an embodiment.

FIG. 7 shows a switching probability of different variable resistor cells according to an embodiment.

FIG. 7 is a graph of switching probabilities of variable resistor cells having circular upper surfaces. More specifically, FIG. 7 is a graph of switching probabilities of variable resistor cells having upper surface diameters of 30 nm, 40 nm, 50 nm, and 100 nm, respectively. Referring to FIG. 7, a temperature-switching probability graph varies according to the diameter of the variable resistor cell. Accordingly, the diameter of the upper surface of the variable resistor cell may be used as a design parameter for implementing a switching probability used at a specific temperature.

Figure 8:
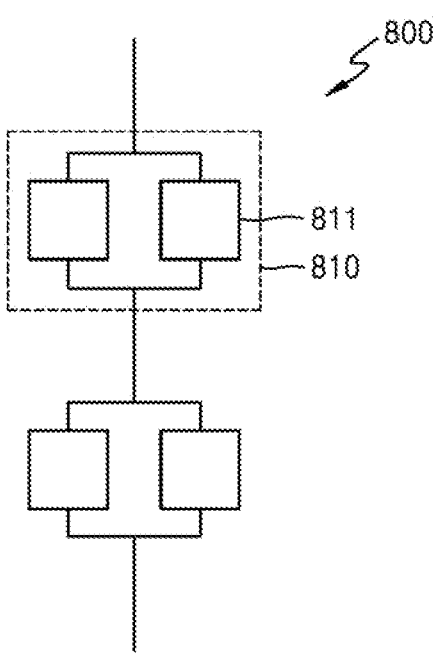
FIGS. 8 and 9 show a variable resistor array according to embodiments.

FIG. 8 shows a variable resistor array 800 according to an embodiment.

The variable resistor array 800 may include variable resistor subarrays 810 electrically connected in series. The variable resistor subarray 810 may include variable resistor cells 811 electrically connected in parallel.

The variable resistor array 800 may include various numbers of variable resistor cells 811 and variable resistor subarrays 810. Also, the variable resistor subarrays 810 may include the same or different numbers of variable resistor cells 811. For example, the variable resistor subarray 810 may include several to thousands of variable resistor cells 811, but embodiments are not limited thereto. For example, the variable resistor array 800 may include several to hundreds of variable resistor subarrays 810, but embodiments are not limited thereto.

In the variable resistor array 800, the variable resistor cells 811 may be arranged in a matrix. In embodiments, in the variable resistor array 800, the variable resistor cells 811 may be arranged in accordance with space efficiency or design requirements.

Figure 9:
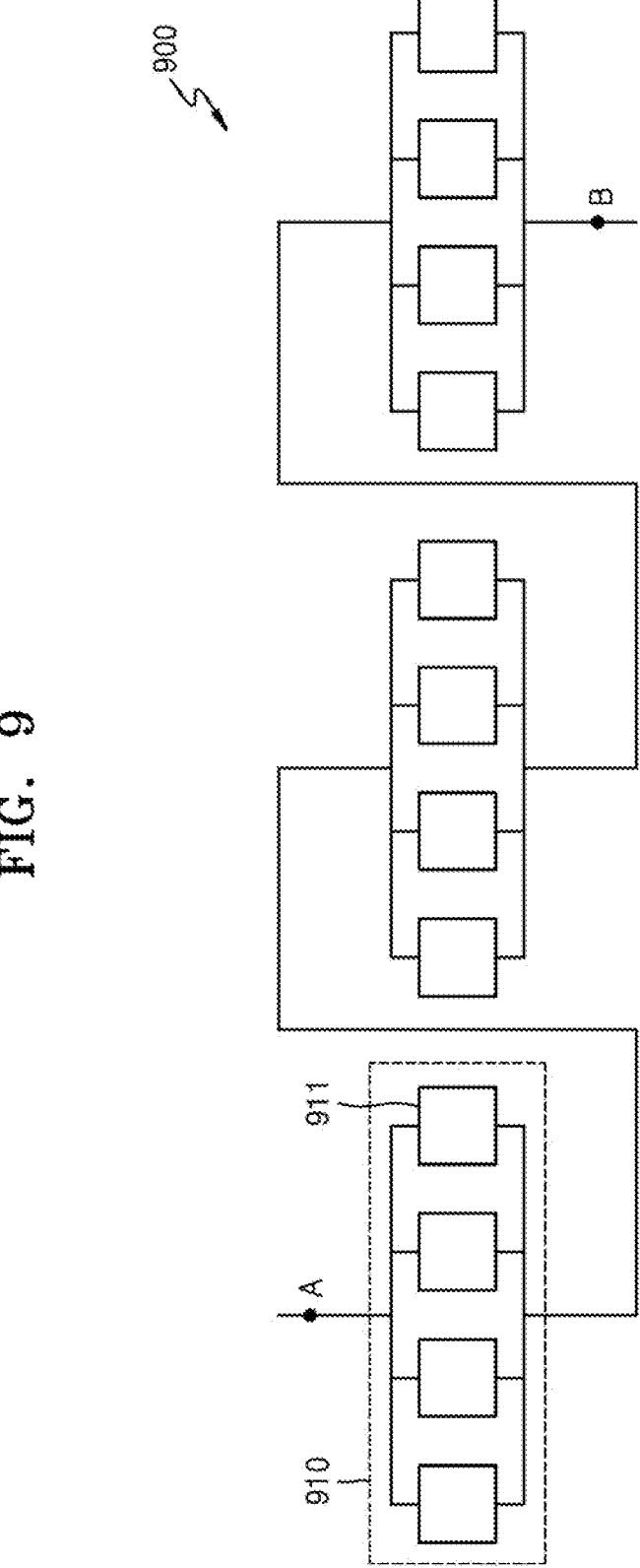

FIG. 9 shows a variable resistor array 900 according to an embodiment.

In the variable resistor array 900 according to an embodiment, the variable resistor cells 911 have the same resistance in the AP state, the variable resistor cells 911 have the same resistance in the P state, and the variable resistor subarrays 910 include the same number of variable resistor cells 911. Under such conditions, the composite resistance of the variable resistor array 900 at a certain temperature T may be expressed as Equation 1, below:

$$R_{com,T} = \sum_{i=1}^{N} \frac{1}{\frac{a_{i,T}}{R_{AP,T}} + \frac{(M - a_{i,T})}{R_{P,T}}} \qquad \text{Equation 1}$$

In Equation 1, $R_{com,T}$ may denote the composite resistance of the variable resistor array at temperature T, $R_{AP,T}$ may denote the resistance of the variable resistor cell in the AP state at temperature T, $R_{P,T}$ may denote the resistance of the variable resistor cell in the P state at temperature T, N may denote the number of variable resistor subarrays included in the variable resistor array, M may denote the number of variable resistor cells included in one variable resistor subarray, and $a_{i,T}$ may denote the number of variable resistor cells in the AP state in the ith variable resistor subarray at temperature T. For example, in the variable resistor cell 911, the variable resistor subarray 910 and the variable resistor array 900 shown in FIG. 9, when $a_{1,T}=2$, $a_{2,T}=1$, $a_{3,T}=2$, the composite resistance $R_{com,T}$ between node A and node B may be expressed according to Equation 2 below:

$$R_{com,T} = \frac{1}{\frac{2}{R_{AP,T}} + \frac{2}{R_{p,T}}} + \frac{1}{\frac{1}{R_{AP,T}} + \frac{3}{R_{p,T}}} + \frac{1}{\frac{2}{R_{AP,T}} + \frac{2}{R_{p,T}}}. \qquad \text{Equation 2}$$

The greater the number of variable resistor cells 911, the greater the means for measuring radiant heat. For example, radiant heat may be measured in time parallel by the plurality of variable resistor cells 911. When the plurality of variable resistor cells 911 are all connected in series or all connected in parallel, the composite resistance may not be compatible with the operating voltage of the system. Accordingly, according to design requirements, a variable resistor subarray 910 may be implemented by electrically connecting an appropriate number of variable resistor cells 911 in parallel, and a variable resistor array 900 may be implemented by electrically connecting an appropriate number of variable resistor subarrays 910 in series.

Because $a_{i,T}$ is a probabilistic number determined from the switching probability, the average resistance over time of the composite resistance of the variable resistor array may be more meaningful than the composite resistance of the variable resistor array at an instant. The amount of time used for measuring average resistance may be reduced by having multiple variable resistor cells measuring radiant heat in parallel over time.

Figure 15:
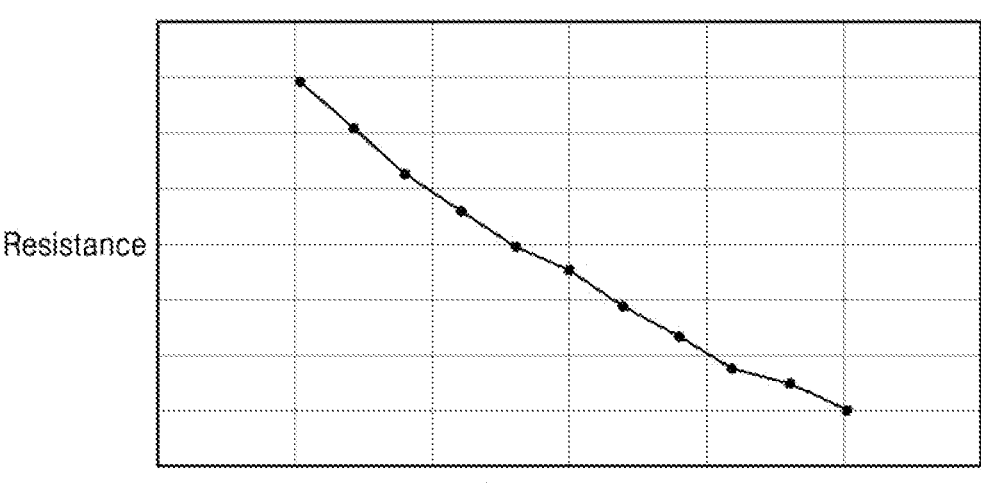
FIG. 15 is a temperature-resistance graph of a variable resistor array according to an embodiment.

FIG. 15 shows a temperature-average resistance graph of the variable resistor array 900. Because the resistance of the variable resistor cell 911 varies with temperature, the average resistance of the variable resistor array 900 may vary with temperature. Because the composite resistance of the variable resistor array 900 is related to the resistance of the variable resistor cell in the AP state, the average resistance of the variable resistor array 900 may decrease as the temperature increases. For example, the average resistance according to the temperature of the variable resistor array 900 may show a similar tendency to the average resistance of the variable resistor cell in the AP state.

Because the average resistance of the variable resistor array 900 changes with temperature, the temperature may be measured by measuring the average resistance of the variable resistor array 900. Accordingly, the variable resistor array 900 may be used as a bolometer. The variable resistor array 900 may also be implemented as a thermal imaging pixel and a thermal imaging sensor.

Because the temperature-average resistance relationship of the variable resistor array 900 is due to the state switching of the variable resistor cells according to the temperature change, an operation of resetting the variable resistor cells into a specific state may be not required for measuring the temperature using the variable resistor array 900. Accordingly, a thermal imaging pixel, a thermal imaging sensor, and a bolometer which do not require a reset operation may be implemented.

Figure 10A:
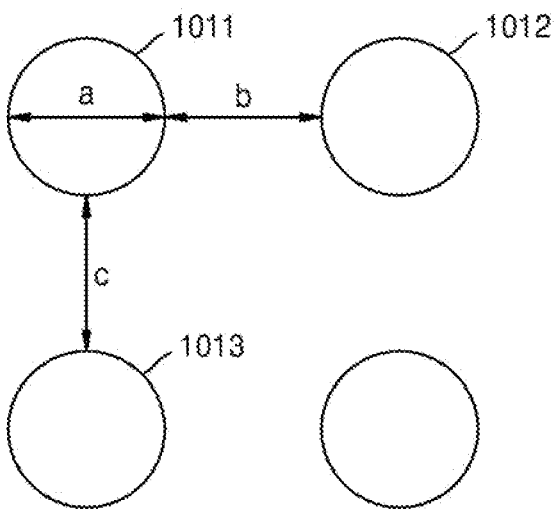
FIGS. 10A to 10C are diagrams illustrating an arrangement of variable resistor cells according to embodiments.
Figure 10B:
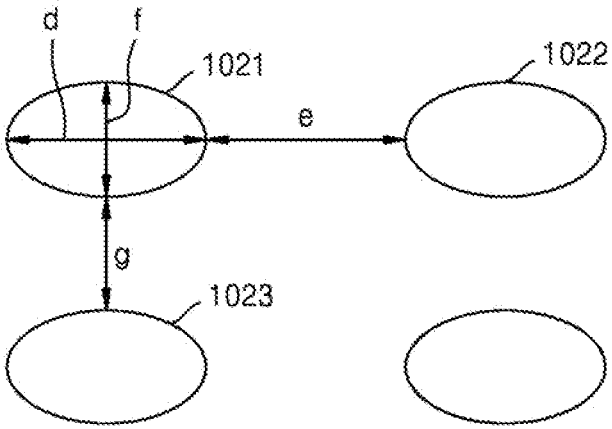
Figure 10C:
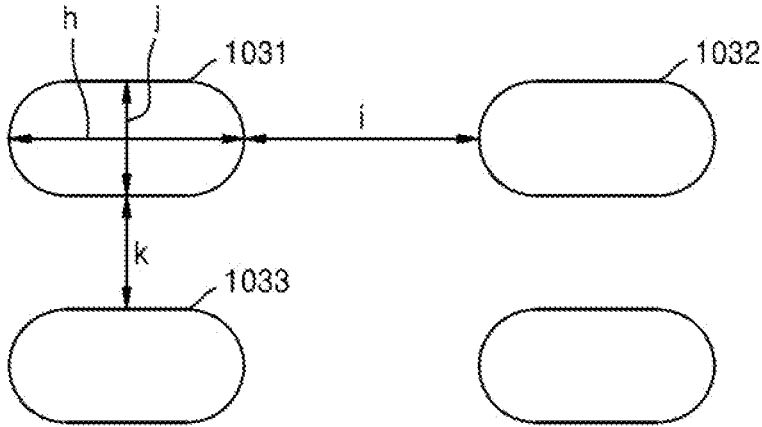

FIGS. 10A to 10C are diagrams for illustrating the arrangement of variable resistor cells according to embodiments.

In the variable resistor array, the variable resistor cells may be arranged to minimize an effect of a magnetic field caused by a change in magnetic polarity of the free layer on adjacent variable resistor cells.

As shown in FIG. 10A, upper surfaces of variable resistor cells, for example first variable resistor cell 1011, second variable resistor cell 1012, and third variable resistor cell 1013, may be circular. A distance at which adjacent variable resistor cells are spaced apart may be equal to or greater than a diameter of the variable resistor cell. For example, a distance b at which a first variable resistor cell 1011 is spaced apart from a second variable resistor cell 1012 may be greater than or equal to a diameter a of the first variable resistor cell 1011. Similarly, a distance c between the first variable resistor cell 1011 and a third variable resistor cell 1013 may be equal to or greater than the diameter a of the first variable resistor cell 1011.

As shown in FIG. 10B, upper surfaces of variable resistor cells, for example first variable resistor cell 1021, second variable resistor cell 1022, and third variable resistor cell 1023, may have an elliptical shape. A distance at which adjacent variable resistor cells are spaced apart may be equal to or greater than a length of a long axis or a length of a short axis of the variable resistor cell. For example, distance e at which a first variable resistor cell 1021 is spaced apart from a second variable resistor cell 1022 may be equal to or greater than a length d of a major axis of the first variable resistor cell 1021. A distance g at which the first variable resistor cell 1021 is spaced apart from a third variable resistor cell 1023 may be equal to or greater than a length f of a minor axis of the first variable resistor cell 1021.

As shown in FIG. 10C, upper surfaces of variable resistor cells, for example first variable resistor cell 1031, second variable resistor cell 1032, and third variable resistor cell 1033, may have an arbitrary shape including curves and straight lines. A distance between adjacent variable resistor cells may be equal to or greater than the length of the variable resistor cells. For example, a distance i between a first variable resistor cell 1031 and a second variable resistor cell 1032 may be equal to or greater than a length h of the first variable resistor cell 1031 in the direction of the distance i. A distance k between the first variable resistor cell 1031 and a third variable resistor cell 1033 may be equal to or greater than a length j of the first variable resistor cell 1031 in the direction of the distance k.

Figure 11:
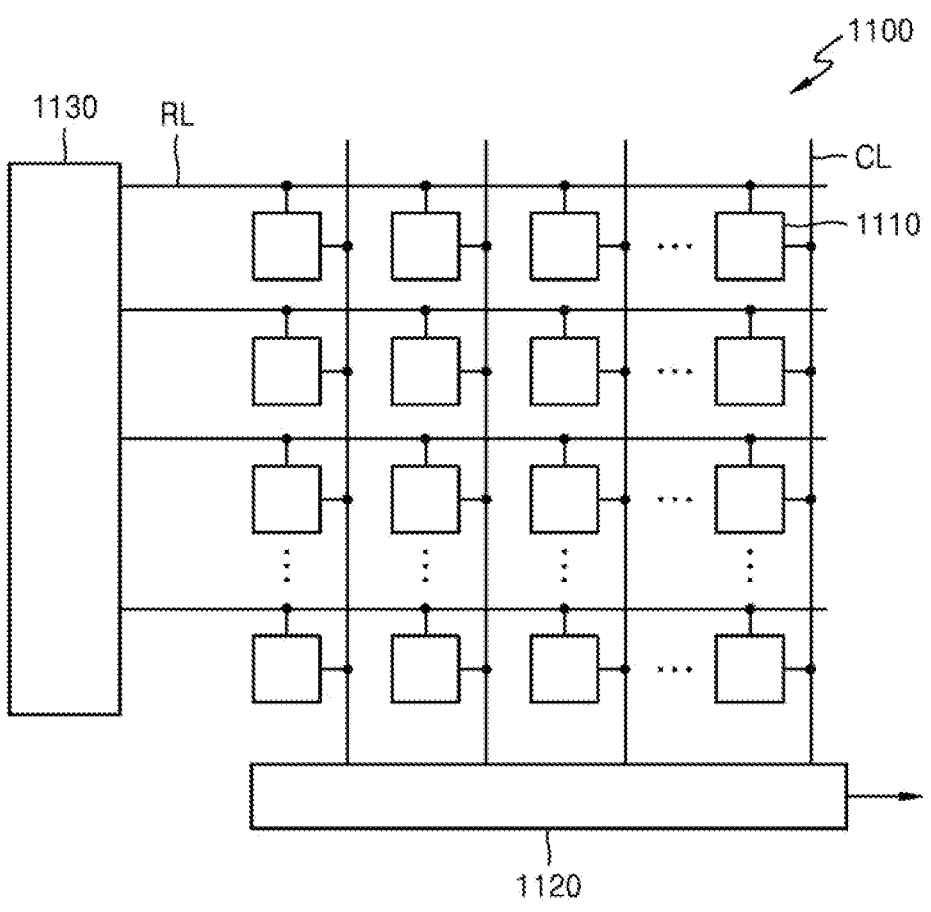
FIG. 11 shows a thermal imaging sensor according to an embodiment.

FIG. 11 illustrates a thermal imaging sensor 1100 according to an embodiment.

The thermal imaging sensor 1100 may include a thermal imaging pixel 1110 and a readout circuit 1120. The thermal imaging sensor 1100 may further include a row driver 1130. The thermal imaging sensor 1100 may further include components such as a timing controller for controlling operations or timings of the readout circuit 1120 and the row driver 1130.

The thermal imaging sensor 1100 may include a plurality of thermal imaging pixels 1110 arranged in a matrix. The plurality of thermal imaging pixels may be driven in units of one or more rows by the row driver 1130. The row driver 1130 may receive a control signal and select at least one row line to be driven according to the control signal. The thermal imaging pixel 1110 may output electrical signals in response to row line selection.

The thermal imaging pixel 1110 may output electrical signals corresponding to the received radiant heat. The thermal imaging pixel 1110 may include at least one variable resistor array whose composite resistance changes according to temperature. The thermal imaging pixel 1110 may output electrical signals corresponding to the composite resistance of the variable resistor array.

The readout circuit 1120 may read electrical signals output from the thermal imaging pixel 1110. The readout circuit 1120 may read electrical signals of a plurality of thermal imaging pixels in units of one or more columns. The readout circuit 1120 may convert an analog signal output from the thermal imaging pixel 1110 into a digital signal and output the converted digital signal. The digital signal may be transferred to a processor or memory. In some embodiments, the processor or memory may be included inside the thermal imaging sensor 1100.

The temperature range detected by the thermal imaging sensor 1100 may include a range of 200 Kelvin to 400 Kelvin. In addition, a wavelength range of electromagnetic radiation detected by the thermal imaging sensor 1100 may include a range of 10 μm to 14 μm. The thermal imaging sensor 1100 may be used in a thermal imaging camera for detecting electromagnetic radiation having a wavelength in the far infrared. The thermal imaging sensor 1100 may be used in a thermal imaging camera to detect electromagnetic radiation emitted by humans. The thermal imaging sensor 1100 may have a resolution of high definition (HD), full HD (FHD), quad HD (QHD), 4K ultra HD (UHD), or 8K UHD, but embodiments are not limited thereto. Thermal sensitivity of the thermal imaging sensor 1100 may be 1 Kelvin or less, but embodiments are not limited thereto.

Figure 12:
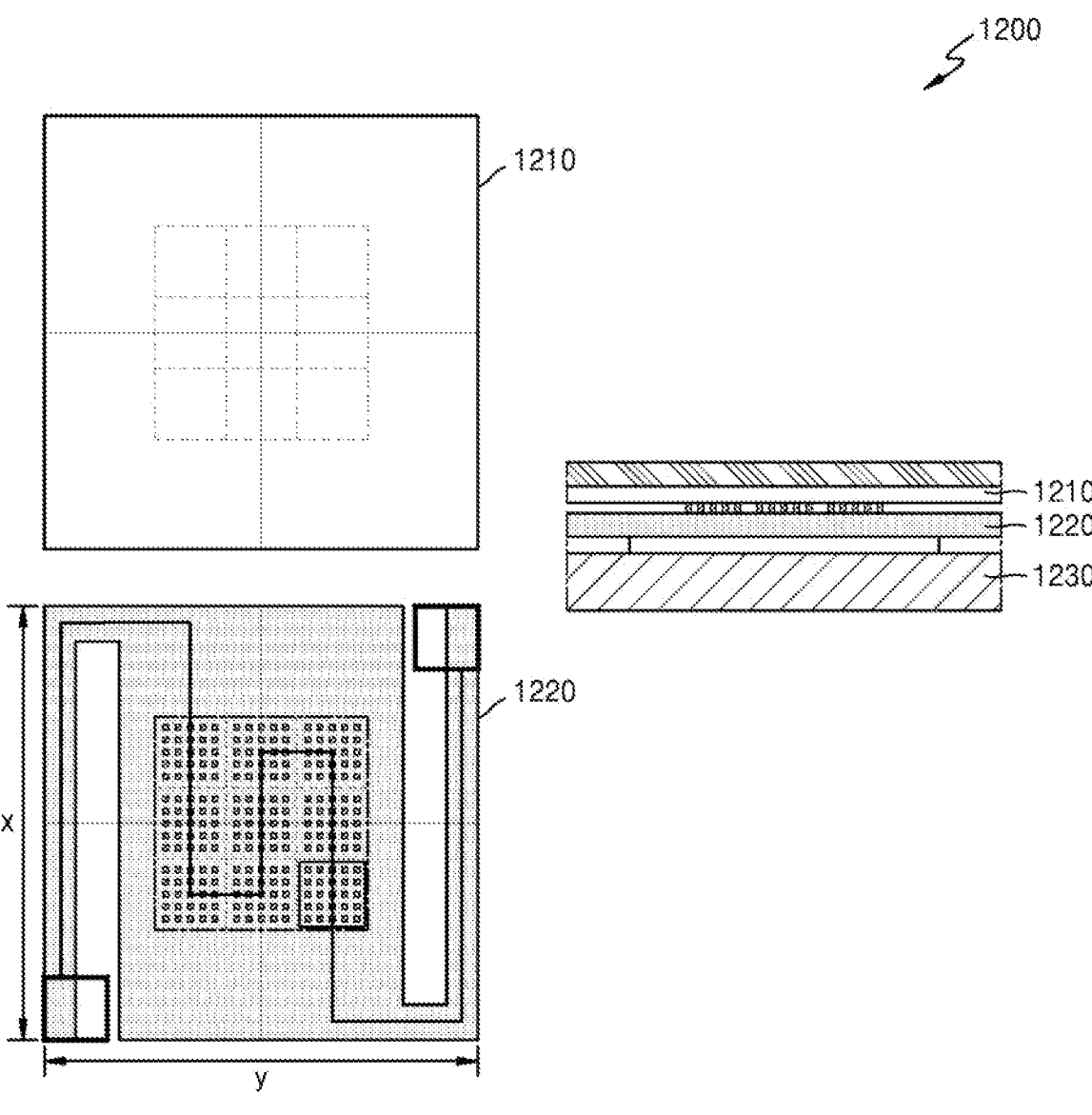
FIGS. 12 and 13 show a thermal imaging pixel according to embodiments.

FIG. 12 illustrates a thermal imaging pixel 1200 according to an embodiment.

The thermal imaging pixel 1200 may have a horizontal length y and a vertical length x in units of μm. For example, the horizontal length y and the vertical length x of the thermal imaging pixel 1200 may be in a range of 5 μm to 20 μm, but embodiments are not limited thereto. Because the length of the thermal imaging pixel 1200 is in units of μm, a thermal imaging sensor having a resolution of HD, FHD, QHD, 4K UHD, or 8K UHD may be implemented using the thermal imaging pixel 1200.

The thermal imaging pixel 1200 may have a structure in which a heat absorbing layer 1210, a heat sensing layer 1220, and a readout integrated circuit (ROIC) layer 1230 are stacked. The heat absorbing layer 1210 may be a layer for absorbing radiant heat. The heat absorbing layer 1210 may include TIN, TaN, NbN, Ni, Ti, Au, Ta, W, Ag, or a combination thereof, but embodiments are not limited thereto. A variable resistor array may be mounted on the heat sensing layer 1220. The composite resistance of the variable resistor array may change as the temperature increases due to radiant heat absorbed by the heat absorbing layer. A pixel readout circuit for reading electrical signals corresponding to the composite resistance of the variable resistor array may be mounted on the ROIC layer 1230 of the variable resistor array.

Figure 13:
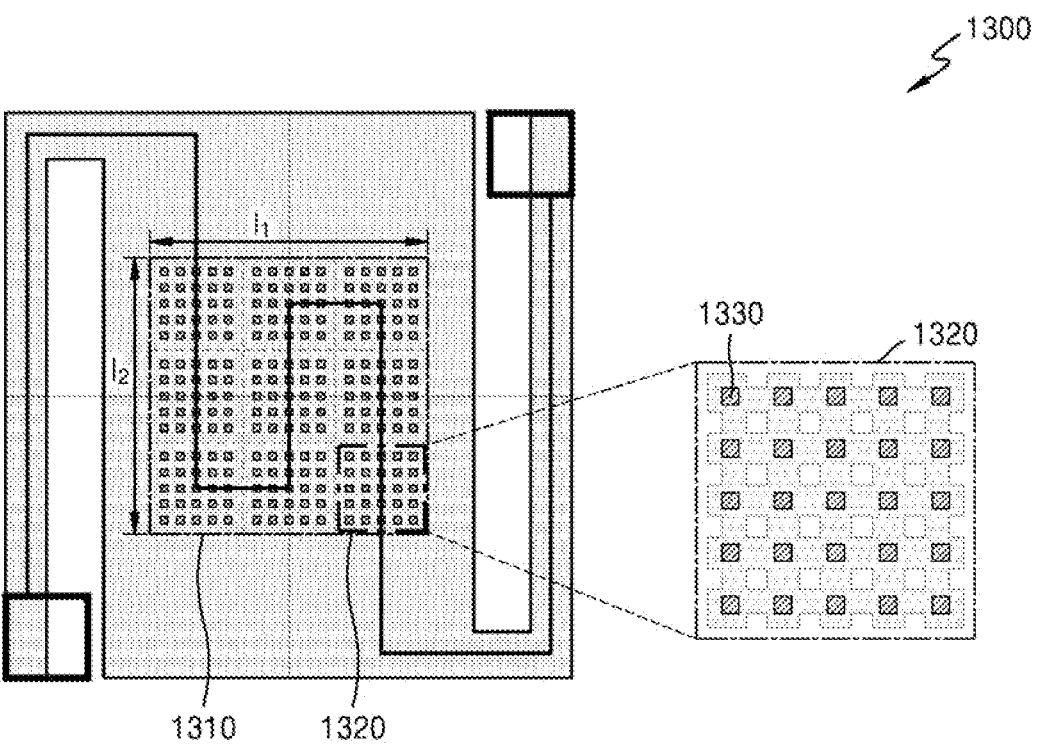

FIG. 13 illustrates a thermal imaging pixel 1300 according to an embodiment.

The thermal imaging pixel 1300 may include a variable resistor array 1310 and a pixel readout circuit configured to read electrical signals corresponding to the composite resistance of the variable resistor array 1310.

The variable resistor array 1310 may include variable resistor subarrays electrically connected in series. The variable resistor subarray 1320 may include variable resistor cells 1330 electrically connected in parallel. In the variable resistor array 1310, the variable resistor subarrays may be arranged in a matrix. As an example, nine variable resistor subarrays arranged in a 3×3 arrangement are shown in FIG. 13. In the variable resistor subarray 1320, variable resistor cells 1330 may be arranged in a matrix. As an example, an enlarged view of the variable resistor subarray 1320 is shown on the right side of FIG. 13, and 25 variable resistor cells 1330 are shown as being arranged in a 5×5 arrangement in the enlarged view.

The variable resistor array 1310 may have a horizontal length $l_1$ and a vertical length $l_2$ in units of μm. The size of the variable resistor array 1310 may have a size allows the variable resistor array 1310 to detect radiant heat emitted by human body temperature. For example, the size of the variable resistor array 1310 may be 12 μm×12 μm, 8 μm×8 μm, or 5 μm×5 μm, but embodiments are not limited thereto.

The composite resistance of the variable resistor array 1310 may have a resistance value in a range suitable for measuring heat. In addition, the composite resistance of the variable resistor array 1310 may have a resistance value within a range compatible with an operating voltage of the thermal imaging pixel and the thermal imaging sensor. For example, the composite resistance of the variable resistor array 1310 may be in the range of 100 KΩ to 500 KΩ, but embodiments are not limited thereto.

Figure 14:
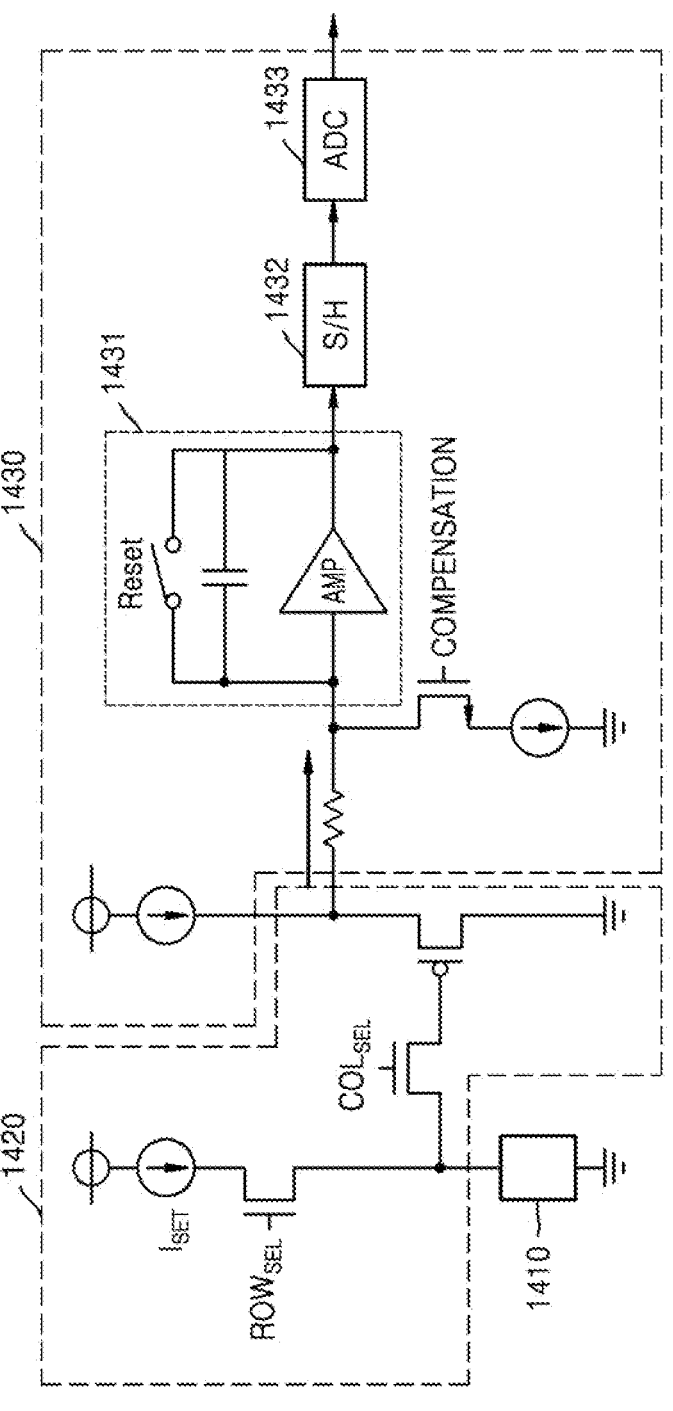
FIG. 14 is a diagram illustrating a pixel readout circuit and a readout circuit according to an embodiment.

FIG. 14 is a diagram for describing a pixel readout circuit 1420 and a readout circuit 1430 according to an embodiment.

The pixel readout circuit 1420 may be configured to read electrical signals corresponding to the composite resistance of the variable resistor array 1410. The pixel readout circuit 1420 may be configured to read signals according to the row select signal $ROW_{SEL}$ and the column select signal $COL_{SEL}$. The pixel readout circuit 1420 may be configured to supply current to the variable resistor array 1410. The electrical signals read by the pixel readout circuit 1420 may be a voltage generated based on the supplied current $I_{SET}$ and the composite resistance of the variable resistor array 1410.

Because the state of the variable resistor cell is determined probabilistically, the average state of the variable resistor cell over a period of time may be more meaningful than the state of the variable resistor cell at an instant. For example, the average resistance of the variable resistor array 1410 over a period of time may be more significant than the composite resistance of the variable resistor array 1410 at an instant. For example, in the case of an in-plane MTJ, a switching time from a P state to an AP state may take tens to hundreds of ns, and in the case of a perpendicular MTJ, a switching time from a P state to an AP state may take several μs. Because the switching speed of the MTJ may be very fast, continuous-time measurement of the composite resistance of the variable resistor array 1410 may provide higher average resistance accuracy than discrete-time measurement of the composite resistance of the variable resistor array 1410.

The readout circuit 1430 may include an integrator 1431 for continuous-time integrating of electrical signals read by the pixel readout circuit 1420. In embodiments, the integrator 1431 may be referred to as an integrator circuit. In addition, the readout circuit 1430 may include a sample and hold (S/H) circuit 1432 for sampling and holding the integrated signals. In addition, the readout circuit 1430 may include an analog to digital converter (ADC) 1433 for converting an analog signal output from the integrator 1431 into a digital signal.

The temperature may be measured with a thermal sensitivity of 1 Kelvin from the average resistance of the variable resistor cell for a time during which the variable resistor cell may switch a state $10^5$ times. When the variable resistor array 1410 includes a thousand variable resistor cells, because the thousand variable resistor cells may sense radiant heat in parallel over time, the temperature may be measured with a thermal sensitivity of 1 Kelvin from the average resistance of the variable resistor array 1410 for a time period during which the variable resistor array 1410 may switch states $10^2$ times. When the variable resistor array 1410 includes the in-plane MTJ having a switching time of 100 ns, the time for the variable resistor array 1410 to switch states $10^2$ times may be 10 μs. Accordingly, the integrating time of the integrator 1431 used by the thermal imaging sensor to operate with a thermal sensitivity of 1K may become 10 μs. When the variable resistor array 1410 includes a perpendicular MTJ with a switching time of 1 μs, the time for the variable resistor array 1410 to switch states $10^2$ times may be 100 μs. Accordingly, the integrating time of the integrator 1431 used by the thermal imaging sensor to operate with a thermal sensitivity of 1K may become 100 μs. The variable resistor array 1410 may be configured to include thousands of variable resistor cells, and because the switching time of the MTJ may be in units of ns or μs, the integrating time of the integrator 1431 used by the thermal imaging sensor to operate with a thermal sensitivity of 1K may be less than 1 ms. Depending on the number of variable resistor cells included in the variable resistor array 1410 and the switching time of the MTJ, the integrating time of the integrator 1431 used by the thermal imaging sensor to operate with a thermal sensitivity of 1 Kelvin may change.

Thermal imaging pixels, thermal imaging sensors, and bolometers that operate at high speed may be implemented by using a variable resistor array including variable resistor cells that measure radiant heat in parallel over time. In addition, by using a plurality of variable resistor cells to detect radiant heat, a high-accuracy thermal imaging pixel, thermal imaging sensor, and bolometer may be implemented. In addition, by using RTN characteristics of variable resistor cells to measure temperature, a thermal imaging pixel, a thermal imaging sensor, and a bolometer that do not require a reset operation to a specific state may be implemented. In addition, a thermal imaging pixel and thermal imaging sensor with high accuracy may be implemented by using a readout circuit that continuously reads the combined resistance of the variable resistor array over time.

It should be understood that embodiments described herein are provided in a descriptive sense only, and not for purposes of limitation. Descriptions of features or aspects within each embodiment should be considered as available for other similar features or aspects in other embodiments. While one or more embodiments have been described with reference to the figures, it will be understood by those of ordinary skill in the art that various changes in form and details may be made therein without departing from the spirit and scope as defined by the following claims.

What is claimed is:

1. A thermal imaging pixel comprising:
a variable resistor array; and
a pixel readout circuit configured to read electrical signals corresponding to a composite resistance of the variable resistor array,
wherein the variable resistor array comprises a plurality of variable resistor subarrays electrically connected in series,
wherein each variable resistor subarray of the plurality of variable resistor subarrays comprises a plurality of variable resistor cells electrically connected in parallel,
wherein each variable resistor cell of the plurality of variable resistor cells has a resistance which changes according to a temperature change,
wherein each variable resistor cell comprises a magnetic tunnel junction (MTJ) having a random telegraph noise (RTN) characteristic in which a parallel (P) state and an antiparallel (AP) state are determined probabilistically according to a temperature change,
wherein a resistance in the P state is different from a resistance in the AP state, and
wherein the thermal imaging pixel does not require a reset operation to set the MTJ into either the P state or the AP state.

2. The thermal imaging pixel of claim 1, wherein the each variable resistor cell comprises:
a pinned layer having a fixed magnetic polarity;
an insulation layer positioned adjacent to the pinned layer; and
a free layer positioned adjacent to the insulation layer and having a variable magnetic polarity.

3. The thermal imaging pixel of claim 2, wherein a direction of the fixed magnetic polarity of the pinned layer is parallel to a direction in which the pinned layer extends.

4. The thermal imaging pixel of claim 2, wherein a direction of the fixed magnetic polarity of the pinned layer intersects a direction in which the pinned layer extends.

5. The thermal imaging pixel of claim 2, wherein based on a magnetization direction of the free layer being parallel to a magnetization direction of the pinned layer, the free layer has a first energy level, and
wherein based on the magnetization direction of the free layer being antiparallel to the magnetization direction of the pinned layer, the free layer has a second energy level different from the first energy level.

6. The thermal imaging pixel of claim 1, wherein the plurality of variable resistor cells are arranged in a matrix.

7. The thermal imaging pixel of claim 1, wherein a first variable resistor cell from among the plurality of variable resistor cells is adjacent to a second variable resistor cell from among the plurality of variable resistor cells, and wherein a distance between the first variable resistor cell and the second variable resistor cell is greater than or equal to a length of the first variable resistor cell in a direction of the distance.

8. The thermal imaging pixel of claim 1, wherein an average of the composite resistance over time varies according to the temperature.

9. The thermal imaging pixel of claim 1, wherein an average of the composite resistance over time decreases as the temperature increases.

10. The thermal imaging pixel of claim 1, wherein a length of the variable resistor array is greater than or equal to 5 micrometers.

11. The thermal imaging pixel of claim 1, wherein at least one variable resistor cell of the plurality of variable resistor cells has a length in units of nanometers.

12. The thermal imaging pixel of claim 1, wherein the pixel readout circuit is further configured to supply a current to the variable resistor array from a current source.

13. The thermal imaging pixel of claim 1, wherein the electrical signals comprise a voltage corresponding to the composite resistance of the variable resistor array, and wherein the pixel readout circuit is further configured to read the voltage.

14. A thermal imaging sensor comprising:

a thermal imaging pixel comprising a variable resistor array; and a readout circuit configured to read electrical signals corresponding to an average of a composite resistance of the variable resistor array over time;

wherein the variable resistor array comprises a plurality of variable resistor subarrays electrically connected in series, wherein each of the plurality of variable resistor subarrays comprises a plurality of variable resistor cells electrically connected in parallel, wherein each variable resistor cell of the plurality of variable resistor cells has a resistance which changes according to a temperature change, wherein each variable resistor cell comprises a magnetic tunnel junction (MTJ) having a random telegraph noise (RTN) characteristic in which a parallel (P) state and an antiparallel (AP) state are determined probabilistically according to a temperature change, wherein a resistance in the P state is different from a resistance in the AP state, and wherein the thermal imaging pixel does not require a reset operation to set the MTJ into either the P state or the AP state.

15. The thermal imaging sensor of claim 14, wherein a temperature range detected by the thermal imaging sensor comprises a range of 200 Kelvin to 400 Kelvin.

16. The thermal imaging sensor of claim 14, wherein a wavelength range of electromagnetic radiation detected by the thermal imaging sensor comprises a range of 10 micrometers to 14 micrometers.

17. The thermal imaging sensor of claim 14, wherein the readout circuit comprises an integrator circuit configured to integrate electrical signals output from the thermal imaging pixel.

18. The thermal imaging sensor of claim 17, wherein an integrating time of the integrator circuit used to operate the thermal imaging sensor at a thermal sensitivity of 1 Kelvin is less than 1 ms.

19. The thermal imaging sensor of claim 17, further comprising an analog to digital converter (ADC) configured to convert an analog signal output from the integrator circuit into a digital signal.

20. A bolometer comprising:

a variable resistor array comprising a plurality of variable resistor subarrays electrically connected in series, wherein each variable resistor subarray of the plurality of variable resistor subarrays includes a plurality of variable resistor cells electrically connected in parallel, wherein each variable resistor cell of the plurality of variable resistor cells has a resistance which changes according to a temperature change, wherein each variable resistor cell comprises a magnetic tunnel junction (MTJ) having a random telegraph noise (RTN) characteristic in which a parallel (P) state and an antiparallel (AP) state are determined probabilistically according to a temperature change, wherein a resistance in the P state is different from a resistance in the AP state, and wherein the thermal imaging pixel does not require a reset operation to set the MTJ into either the P state or the AP state.

* * * * *